(12) United States Patent
Agustsson et al.

(10) Patent No.: US 7,411,361 B2
(45) Date of Patent: Aug. 12, 2008

(54) METHOD AND APPARATUS FOR RADIO FREQUENCY CAVITY

(75) Inventors: Ronald B. Agustsson, Rolling Hills Estates, CA (US); Salime M. Boucher, Los Angeles, CA (US); Pedro E. Frigola, Culver City, CA (US); Alex Y. Murokh, Sherman Oaks, CA (US); James B. Rosenzweig, Los Angeles, CA (US); Gil Travish, Santa Monica, CA (US)

(73) Assignee: Radiabeam Technologies LLC, Marina Del Rey, CA (US)

(*) Notice: Subject to any disclaimer, the term of this patent is extended or adjusted under 35 U.S.C. 154(b) by 0 days.

(21) Appl. No.: 11/565,165

(22) Filed: Nov. 30, 2006

(65) Prior Publication Data

US 2008/0129203 A1   Jun. 5, 2008

(51) Int. Cl.
*H05H 9/00* (2006.01)
*G21K 1/08* (2006.01)

(52) U.S. Cl. .................. 315/505; 315/500; 250/396 R

(58) Field of Classification Search ............... 315/5.41, 315/500, 505, 111.61, 111.81; 250/396 R, 250/423 R; 313/356, 359.1, 364, 414, 497; 330/4.7, 44, 56

See application file for complete search history.

(56) References Cited

U.S. PATENT DOCUMENTS

| | | | |
|---|---|---|---|
| 3,976,950 A | 8/1976 | Aggus et al. | |
| 4,019,141 A | 4/1977 | Numan et al. | |
| 4,388,601 A | 6/1983 | Sneed, Jr. et al. | |
| 5,285,176 A | 2/1994 | Wong et al. | |
| 5,477,107 A | 12/1995 | Tammaru et al. | |
| 5,497,050 A | 3/1996 | Cheo | |
| 5,744,919 A * | 4/1998 | Mishin et al. | 315/505 |
| 5,811,943 A * | 9/1998 | Mishin et al. | 315/505 |
| 6,094,010 A | 7/2000 | Washio | |
| 6,226,545 B1 | 5/2001 | Gilderdale | |
| 6,246,172 B1 | 6/2001 | Bizen et al. | |
| 6,366,093 B1 | 4/2002 | Hartman | |
| 6,391,251 B1 | 5/2002 | Keicher et al. | |
| 6,448,722 B1 * | 9/2002 | Yu et al. | 315/505 |
| 6,498,444 B1 * | 12/2002 | Hanna et al. | 315/500 |
| 6,856,105 B2 * | 2/2005 | Yao et al. | 315/505 |
| 6,911,939 B2 | 6/2005 | Carson et al. | |
| 7,078,990 B1 | 7/2006 | Patel et al. | |
| 7,208,889 B2 * | 4/2007 | Zavadtsev et al. | 315/500 |
| 7,262,566 B2 * | 8/2007 | Pirozhenko et al. | 315/505 |
| 7,276,708 B2 * | 10/2007 | Barov | 250/396 R |
| 2002/0149316 A1 * | 10/2002 | Mako | 315/5 |
| 2002/0175293 A1 * | 11/2002 | Whitham | 250/396 R |
| 2005/0205772 A1 * | 9/2005 | Zavadtsev et al. | 250/251 |

* cited by examiner

*Primary Examiner*—Thuy Vinh Tran
*Assistant Examiner*—Tung X Le
(74) *Attorney, Agent, or Firm*—Fulwider Patton LLP

(57) ABSTRACT

In an electron accelerator, a conductive housing defines a cavity. Photoelectrons are emitted from a photocathode into the cavity when light is applied to the photocathode. Via an opening formed in a wall of the conductive housing, the photoelectrons are output to the outside of the cavity. Coolant is flowed through a flow path formed in the wall of the conductive housing, to suppress a temperature rise of the conductive housing. The wall of the conductive housing is made by a metal additive manufacturing technique in such a way as to produce a flow path that has a gentle trajectory without discontinuities in gradient.

15 Claims, 4 Drawing Sheets

METHOD AND APPARATUS FOR RADIO FREQUENCY CAVITY

BACKGROUND OF THE INVENTION

The present invention relates to a particle accelerating structure, and more particularly to a structure suitable for both increasing the energy of and raising a repetition frequency of a particle beam periodically emitted from the structure. The particle stream emitting from an RF accelerating structure may be used for multiple purposes, for example medical treatment, non-destructive investigation of solid objects, and the like.

An example of a particle accelerator suitable for application of the present invention is a radio-frequency ("RF") accelerator using a photocathode which typically comprises a conductive housing defining a cavity, a photocathode for emitting photoelectron into the cavity, and a wave guide for generating an RF electric field in the cavity. As light is periodically applied to the photocathode, photoelectrons are emitted into the cavity intermittently. These photoelectrons are converged and accelerated by an RF electric field generated in the cavity. The RF electric field is applied synchronously with application of light to the photocathode. A typical RF accelerator is described in U.S. Pat. No. 6,094,010 to Washio, which is incorporated herein by reference.

Such accelerating structures generally include a housing made from a conducting material such as copper. The housing defines a cavity. A photocathode is mounted on an inner surface of the housing. Into the cavity is fed light (laser) via a window, and illuminates the surface of the photocathode. Photoelectrons are emitted from the photocathode into the cavity. Such a housing may include one or more cells, dividing the cavity into a plurality of sub-cavities which are separated from each other by toroidal shaped discs (known in the art as "irises"). The sub-cavities are sized and configured to resonate in a particular harmonic mode which corresponds to the frequency of a particular electromagnetic field induced in the irises, with the result that a strong longitudinal electric field is generated along a longitudinal central axis of the housing.

Once a longitudinal electric field has been established in this way, the photoelectrons are accelerated along the longitudinal axis to emerge from an exit port. The resulting stream of photoelectrons may used for any of the multiple purposes known in the art.

In general, it is desirable to operate an RF accelerating structure at the highest power possible. Very high duty factor, high gradient photo-injectors and RF cavities in general are a critical component of the next generation of applications in high energy electron beam-based physics. Today, there is a compelling need for these applications, which include linear colliders, x-ray free-electron lasers, inverse Compton scattering sources, as well as associated imaging or analysis applications of interest to homeland security. The key issue for high average power, normal conducting, photo-injectors and RF accelerating structures is to effectively cool the housing structure.

Thermal management of very high duty factor, high gradient RF structures is crucial to their performance. A significant percentage of the applied RF power is deposited on the walls of the housing in specific locations depending on the magnitude and the direction of the electromagnetic fields in that location. This heating presents significant thermal engineering problems. The large amount of power dissipated in the structure can cause "hot spots" and local thermo-mechanical distortions which may lead to detrimental changes in RF properties and beam quality. One of the most challenging parts of an accelerator housing to be cooled are the "irises" which protrude into the cavity of the housing. Another challenging aspect to be cooled is the so-called RF coupler, which is a thin walled interface between the waveguide and the cavity.

Accordingly, the problem of thermal gain has been approached by providing channels within the housing structure, and forcing water to flow through the channels in combination with cooling the water on the outside of the housing by conventional heat dissipation means such as by radiator. However, the prior art is limited in the method for creating, and configuring the channels used for cooling the housing structure.

One method currently used to incorporate cooling channels into RF structures is achieved by drilling elongate cylindrical holes into the structure for example, as described in U.S. Pat. No. 6,094,010 to Washio, which is incorporated herein by reference, and where it is specifically described how cylindrical holes are provided to cool the irises of an RF accelerator. It will be readily understood that because these channels are drilled, they are limited to linear configurations, and are connected to each other at sharp angles. It will be understood that this kind of configuration greatly limits the cooling uniformity and rate of cooling in that fluid flow is dramatically slowed by the sharp changes in direction (discontinuities in flow gradient), thereby reducing the rate at which heat can be extracted.

Another method that has been used to introduce cooling channels into RF structure is to braze sections of the structure together with pre-machined, curve shaped channels cut out in each section. However, brazing multiple components to form high gradient RF structures is a delicate and expensive step, and many braze cycles are needed to build an effective cooling structure. Moreover, the resulting structure is not uniform or homogeneous, which adversely affects the efficiency at which heat can be extracted from the housing by water in the channels.

Thus, there is a need for a method and structure for fabricating an RF housing having a channel system with gentle changes in direction, suitable for cooling the RF housing structure. There is a further need for an RF housing structure having such channel system, that has a uniform and homogeneous configuration, that is not a collection of components, with sections cut out, brazen together. The present invention addresses these and other needs.

SUMMARY OF THE INVENTION

According to a preferred embodiment of the invention, there is described an RF accelerator that has improved cooling characteristics over the prior art. In a preferred embodiment, the RF accelerator has a conductive housing defining a cavity. The housing comprises cells which have a substantially homogeneous composition, wherein assembly of the housing is not achieved by brazing together sheets of metal having cutout shapes for forming an internal flow path. A cathode for emitting particles is provided. A wave guide is provided, coupled to the cavity for guiding a micro wave into the cavity. An opening is disposed in a wall of the conductive housing for guiding the photoelectrons emitted into the cavity out from the cavity to form an electron beam.

A flow path through which coolant flows to forcibly cool the conductive housing is configured to extend through the housing. The conductive housing comprises a cylinder having an inner circumferential surface of a cylindrical shape and a protrusion having a through hole in which the protrusion comprises a toroid like extension from the inner circumferential surface defined by the cylinder toward a center axis of the conductive housing. The flow path enters an external wall of the conductive housing from an outer circumferential surface, and circulates around the through hole defined in the central area of the protrusion, and then returns to the outer circumferential surface of the conductive housing. The flow path comprises a curved portion that in a preferred embodiment comprises at least a semi circle.

In a preferred embodiment, the flow path is configured to conform to the external geometry of the housing, whereby a substantially constant thickness of housing material separates the flow path from the exterior of the housing over a length of the flow path. In another aspect, the flow path has no sharp turns. In yet another aspect, the flow path is not circular in cross section, but may have an elongate cross section.

In a further aspect, the walls of the flow path have a surface roughness (Ra) of between 800 to 1200 micro inches in order to cause turbulent flow of the cooling fluid in the channel, thereby increasing the heat conduction from the housing.

Preferably, the housing is fabricated by a metal additive manufacturing technique, wherein a metal is deposited in layers using a directed material fabrication process controlled by a computer. The metal additive manufacturing technique uses an electron beam to melt metal feedstock in order to build up the layers of material, preferably copper, or an alloy of copper.

In a final aspect, the surface that is exposed to the radiofrequency field is subjected to processing after fabrication in order to achieve surface roughness of less than 63 micro inches. Such a surface is advantageous in order to prevent breakdown of the microwave field.

These and other advantages of the invention will become more apparent from the following detailed description thereof and the accompanying exemplary drawings.

DETAILED DESCRIPTION OF THE PREFERRED EMBODIMENTS

Figure 1:
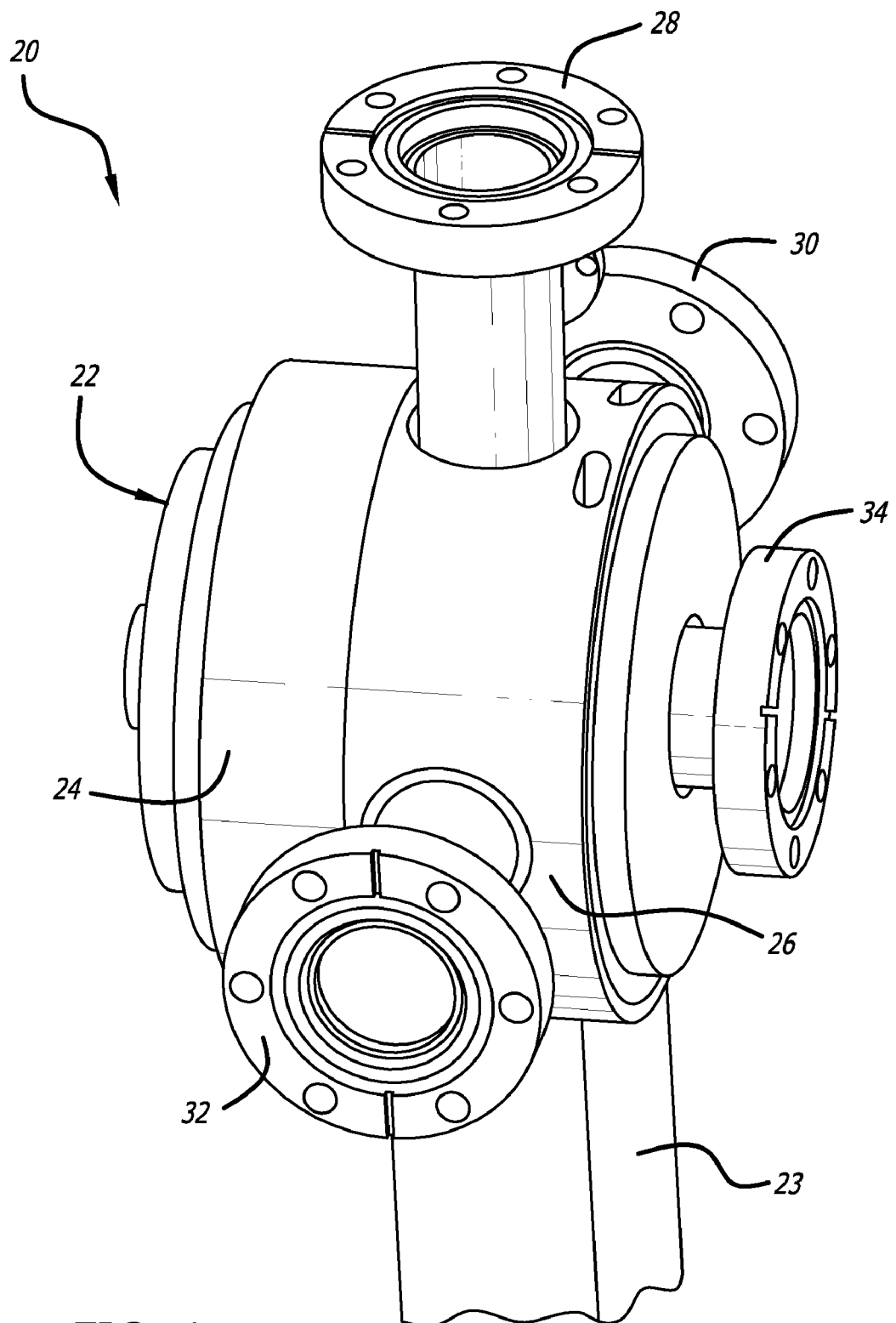
FIG. 1 is a perspective view of an RF accelerator having features of the present invention.

With reference to the drawings, which are provided by way of exemplification and not limitation, preferred embodiments of the invention are described below. Prior to describing the embodiments of the invention, however, known technology used in effectuating the invention will be described.

Turning now to a method of effectuating the present invention, a method of constructing a housing for an RF accelerator will be described that is capable of manufacturing structure capable of overcoming the shortcomings of the prior art. Metal additive fabrication technologies, such as Electron Beam Melting (EBM), have been described for example in U.S. Pat. No. 5,786,562 (Larson), U.S. Pat. No. 6,112,804 (Sachs et al.), U.S. Pat. No. 6,391,251 (Keicher et al.), U.S. Pat. No. 6,401,001 (Jang et al.). The contents of each of these patents is incorporated herein by reference. These technologies employ rapid prototyping layer methods to allow for virtually any three dimensional geometry to be physically constructed, including the provision of channels and openings. The metal additive fabrication techniques used in carrying out the present invention are capable of producing structure in the form of fully dense metal components that are homogenous in metallurgical structure, having no seams or joints, with properties similar to or better than that of conventionally machined materials, and which include a curved channel system that does not include sharp changes of direction or gradient discontinuities.

Using the above described metal additive fabrication techniques, the present invention describes preferred cooling channel configurations for improving the thermal cooling characteristics of an RF accelerator housing structure. These cooling channels have enhanced cooling uniformity, in that they provide gentle changes in flow direction, thus reducing hot spots. The cooling channels allow increased flow rate for a given pressure in a homogeneous metal structure by using smooth bends in the channels, as apposed to the intersections with sharp changes in direction (gradient discontinuities) used previously. Specifically, with reference to FIGS. 1-5 a preferred embodiment of a housing structure for an RF accelerator is described.

FIGS. 1-5 shows a preferred embodiment of the present invention. An RF injector is generally identified by the numeral 20. A housing 22 is positioned at the center of the injector to define a cavity 25, and may comprise a half cell 24 and a full cell 26. More cells may be added, depending on requirements for acceleration. The cells 24, 26 may be joined to each other by brazing. In an alternative embodiment, using the method of fabrication described above, the cells may be fabricated as a single unitary structure. A wave guide 23 provides an entry point for RF wave introduction to the housing. The half cell 24 defines a half cell sub-cavity 36, and the full cell 26 defines a full cell sub-cavity 38. As described above, the resonant frequency of these sub-cavities is utilized to accelerate photon particles which are directed by an external magnetic field set up in the cell structures to exit from the downstream port 34. Accessory ports 28, 30, 32 are provided as tuning ports or vacuum pump out ports, as needed. At the rear of the housing, a cathode 44 is provided as the source of photoelectrons for acceleration through the exit port 34.

Each cell, 24, 26 includes a constriction or "iris" having a narrowed opening 46, 48. Each "iris" may be imagined to be formed as a toroid that protrudes into an otherwise cylindrical interior of the housing, and adjoined continuously to the housing. Thus, the internal radius of the housing reduces to a local minimum at the openings 46, 48 of each toroid. This configuration permits enhanced intensification of the electric field for accelerating photoelectrons through the cavities 36, 38 and finally out of the exit port 34. Of importance to the invention is the presence of cooling channels 40, 42 which are utilized to circulate water around the cells 24, 26 for cooling during operation.

Figure 2:
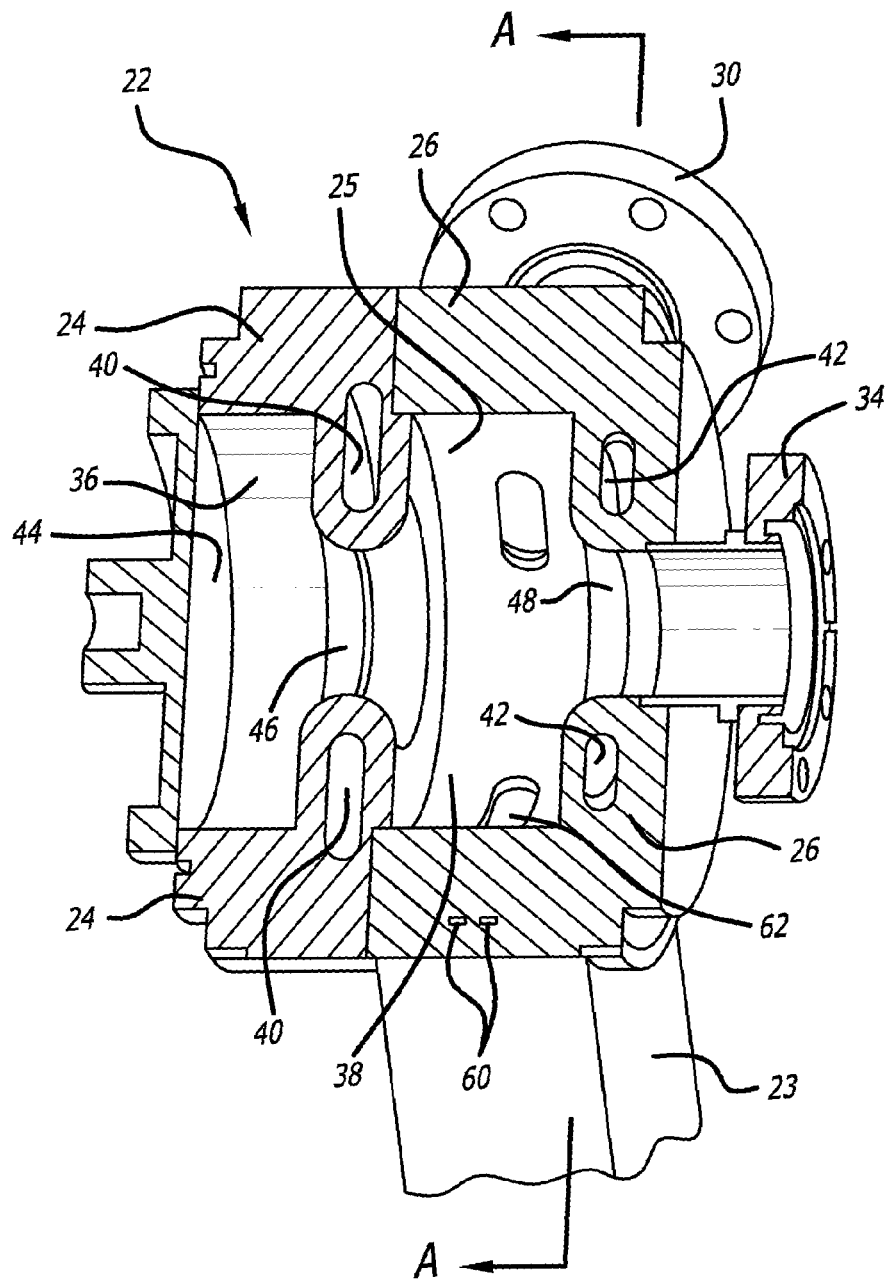
FIG. 2 is a perspective sectional view of the RF accelerator of FIG. 1.

As exemplified in FIG. 2, the channels 40, 42 may be positioned substantially in the toroidal portions of the housing, where the heating effect induced by the magnetic field is greatest. The shape of each channel, made according to the method of fabrication of the present invention described above, is configured to provide a superior cooling effect to the cells 24, 26 and the housing generally. The cross sectional shape of a channel is not limited to being circular, but in a preferred embodiment may be elongate, with an elongate axis extending radially outwardly from the center of the housing.

This aspect provides for a greater surface area contact between fluid and metal cell. Furthermore, as seen in FIG. 2 a channel may be positioned to extend over the majority of the radius of the solid portion of the toroid in which it is positioned, having one point of entry for fluid flow, and one point of exit. With these characteristics, as seen in FIG. 2, the cross sectional configuration of the channel may conform to the cross sectional geometry of the toroidal portion of the cell 26, allowing a substantially constant thickness of metal to surround the channel, at least on the radially interior portion of the housing 22.

Figure 3:
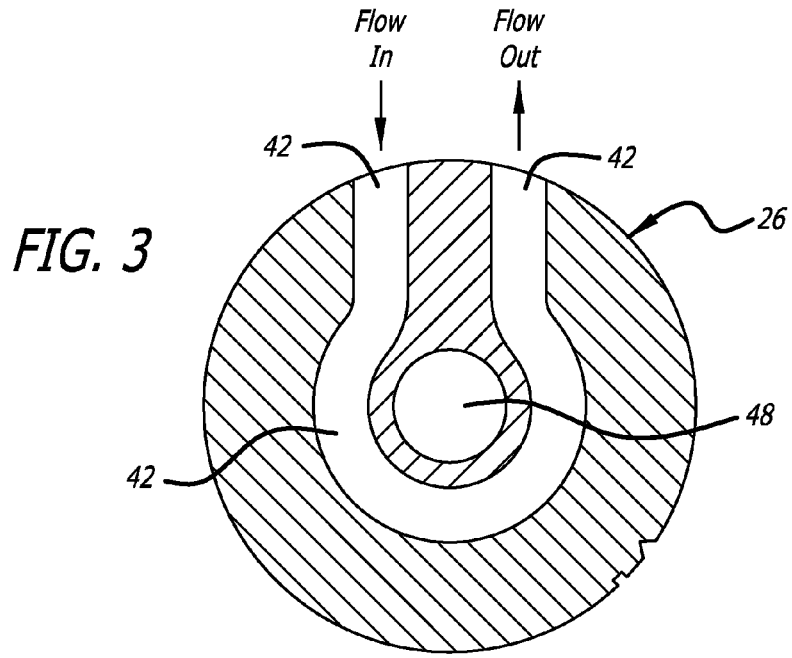
FIG. 3 is a sectional view of portion of the RF accelerator of FIGS. 1 and 2, taken substantially along the line A-A in FIG. 2.

Moreover, as exemplified in FIG. 3, the path of a channel through a cell may be substantially curved, preferably with no discontinuity in the gradient of the walls defining the direction of fluid flow. FIG. 3 exemplifies the path of channel 42 through the cell 26, and in a preferred embodiment has only continuously and evenly curved walls without rapid changes in direction, or discontinuities in flow gradient, allowing fluid to flow through the cell 26 at an enhanced speed, allowing for improved heat extraction during operation. In this plan sectional view of the channel 42, the channel is seen to substantially conform to the circumferential exterior surfaces (internal and external) of the cell 26 over a substantial portion of the length of the channel within the cell, allowing a substantially constant thickness of metal to separate the channel 42 from an exterior circumferential surface. These combined characteristics provide for an improved heat extraction capability of the channel 42. In a preferred embodiment, the cell is formed from copper, or an alloy of copper. However, any metal suitable for manufacturing in the described way may also be used.

Figure 5:
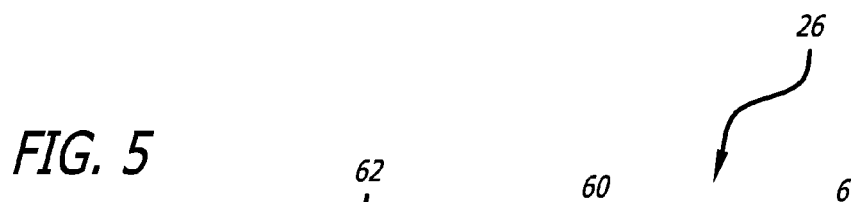
FIG. 5 is a sectional view of portion of the RF accelerator of the previous figures, taken substantially along the line B-B in FIG. 4.
Figure 4:
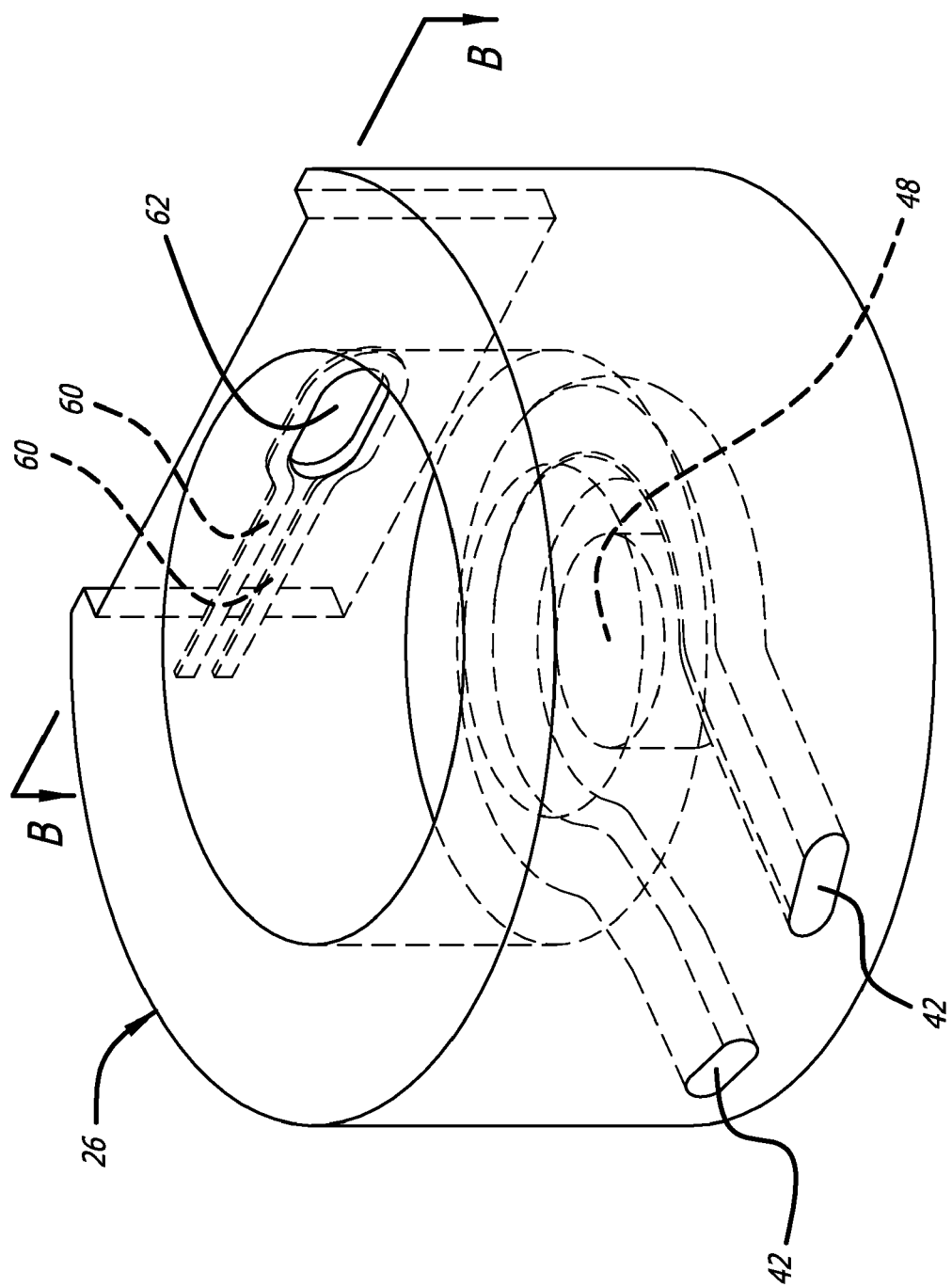
FIG. 4 is a perspective view of a full cell of the RF accelerator of FIG. 1, showing internal channels for fluid flow.

In another aspect of the invention, exemplified in FIGS. 4-5, a cooling channel 60 is provided around the waveguide coupling hole 62, which receives a heavy thermal load in a small area. The coupling inlet hole 62 is an opening in the housing that provides a connection between the cavity 25 and the wave guide 23 for admission of microwaves to the cavity. The coupling inlet hole 62 may have an oval shape to maximize the coupling of the RF power into the RF structure. In a preferred aspect, the cooling circuit 60 conforms to the shape of the coupling hole 62 to enhance the efficiency of cooling this area. In a preferred embodiment, the cooling channel 60 has no discontinuities in flow gradient, and surrounds the coupling hole 62.

In a preferred aspect, the invention is directed to the surface roughness of the cooling channels. Because high surface roughness causes turbulent flow which is superior for cooling at a given flow rate, the present invention may have cooling channels in which dimples are introduced during manufacture, such that the resulting surface has a roughness of at least 1000 micro inches Ra, and preferably in the range of 800 to 1200 micro inches Ra.

In a final aspect of the present invention, the interior surface walls of the cells that are exposed to the radiofrequency field are subjected to processing after fabrication in order to achieve surface roughness of preferably less than 63 micro inches. This may be achieved by a simple machining process. Without such treatment, the radiofrequency field may cause local heating on the surface and reduce the efficiency of the accelerator.

The foregoing method and structure address certain shortcomings in the prior art. By fabricating the housing and the channels according to the method of the present invention, channels having a novel configuration are introduced that provides enhanced cooling, and therefore enhanced operation of the RF accelerator.

Thus, it will be apparent from the foregoing that, while particular forms of the invention have been illustrated and described, various modifications can be made without parting from the spirit and scope of the invention.

We claim:

1. A particle accelerator comprising:
   a conductive housing including a cell, the cell defining a cavity, the cell having a substantially monolithic structure that has no seams or joints internal to the cell;
   a charged particle source for emitting charged particles into the cavity;
   a wave guide coupled to the housing for guiding a micro wave into the cavity;
   an opening disposed in a wall of the conductive housing for guiding the charged particles emitted into the cavity out from the cavity to form an electron beam; and
   a flow path through which coolant flows to forcibly cool the conductive housing;
   wherein the conductive housing comprises a cylinder having an inner circumferential surface and a toroid like protrusion from the inner circumferential surface toward a center axis of the conductive housing;
   wherein the flow path enters an external wall of the conductive housing from an outer circumferential surface, the flow path circulates around a through hole defined in a central area of the protrusion, and then returns to the outer circumferential surface of the conductive housing; and
   wherein the flow path comprises a portion following a curved path.

2. The accelerator of claim 1, wherein the curved path includes at least a semi-circle.

3. The accelerator of claim 1, wherein the flow path is configured to conform to the external geometry of the housing, such that a substantially constant thickness of housing material separates the flow path from an external surface of the housing over a length of the flow path.

4. The accelerator of claim 1, wherein the flow path has no discontinuities in gradient over its length within the housing.

5. The accelerator of claim 4, wherein the flow path has a cross sectional shape that is elongate.

6. The accelerator of claim 1, wherein the flow path is not circular in cross section.

7. The accelerator of claim 6, wherein the flow path has a cross sectional elongate axis that extends outwardly along a radius of the housing.

8. The accelerator of claim 1, wherein the cell is fabricated by a metal additive manufacturing technique, wherein a metal is deposited in layers using a directed material fabrication process controlled by a computer.

9. The accelerator of claim 1, wherein the metal additive manufacturing technique uses an electron beam to melt the metal feedstock in order to build up the layers of material.

10. The accelerator of claim 1, wherein the cell has an internal surface and the internal surface is subjected to machining after fabrication to achieve surface roughness of less than 63 micro inches.

11. The accelerator of claim 1, wherein the conducting material is copper or an alloy of copper.

12. A particle accelerator comprising:
   a conductive housing including a cell, the cell defining a cavity, the cell having a substantially monolithic structure that has no seams or joints internal to the cell;
   a charged particle source for emitting charged particles into the cavity;

a wave guide coupled to the housing for guiding a micro wave into the cavity;

an opening disposed in a wall of the conductive housing for guiding the charged particles emitted into the cavity out from the cavity to form an electron beam; and a flow path through which coolant flows to forcibly cool the conductive housing;

wherein the conductive housing comprises a cylinder having an inner circumferential surface and an opening for connection between the cavity and the wave guide, whereby micro waves may be admitted into the cavity;

wherein the flow path enters an external wall of the conductive housing from an outer circumferential surface, the flow path circulates around the opening, and then returns to the outer circumferential surface of the conductive housing; and wherein the flow path comprises a portion following a curved path.

13. The accelerator of claim 12, wherein the flow path has no discontinuities in flow gradient.

14. The accelerator of claim 13, wherein the flow path includes a semi circle.

15. The accelerator of claim 14, wherein a substantially constant thickness of housing material separates the flow path from the opening over the length of the semicircle.

* * * * *